(12) United States Patent
Wegner

(10) Patent No.: US 11,337,434 B1
(45) Date of Patent: May 24, 2022

(54) OLIVE STORAGE AND PROCESSING METHOD

(71) Applicant: Paul Charles Wegner, San Carlos, CA (US)

(72) Inventor: Paul Charles Wegner, San Carlos, CA (US)

(*) Notice: Subject to any disclaimer, the term of this patent is extended or adjusted under 35 U.S.C. 154(b) by 0 days.

(21) Appl. No.: 17/015,644

(22) Filed: Sep. 9, 2020

Related U.S. Application Data

(60) Provisional application No. 62/922,919, filed on Sep. 9, 2019.

(51) Int. Cl.
*C07H 17/04* (2006.01)
*A23B 7/158* (2006.01)
*A23B 7/154* (2006.01)

(52) U.S. Cl.
CPC .............. *A23B 7/158* (2013.01); *A23B 7/154* (2013.01)

(58) Field of Classification Search
CPC ................................ A23B 7/158; A23B 7/154
USPC .......................................................... 426/268
See application file for complete search history.

(56) References Cited

FOREIGN PATENT DOCUMENTS

ES 2369183 B1 * 10/2012 ............. A23B 7/157

OTHER PUBLICATIONS

Translationm of ES-2369183-B1 (Year: 2012).*

* cited by examiner

*Primary Examiner* — Brent T O'Hern
(74) *Attorney, Agent, or Firm* — Head, Johnson, Kachigian & Wilkinson, PC

(57) ABSTRACT

An olive storage and processing method. In one embodiment of the invention, harvested olives are stored in a storage tank in a storage solution containing water wherein the storage solution contains olive juices and salts. The storage solution with olive juices and salts is passed to a first ion exchange vessel having a strong acid ion exchange resin in hydrogen form at ambient temperature and pressure. Potassium and nitrogen ions and other cations are converted by the strong acid ion exchange resin and organic acids are released in order to create an acidic solution. The acidic solution is then returned to the storage tank for reuse as a storage solution.

7 Claims, 6 Drawing Sheets

OLIVE STORAGE AND PROCESSING METHOD

CROSS-REFERENCE

This application is based on and claims priority to U.S. Provisional Patent Application Ser. No. 62/922,919, filed Sep. 9, 2019, which is incorporated herein in its entirety by reference.

BACKGROUND OF THE INVENTION

1. Field of the Invention

The present invention is directed to an olive storage and processing method. In particular, the present invention is directed to an olive storage and processing method wherein the liquids used for storage and processing are regenerated and reused.

2. Description of the Related Art

Olives are harvested yearly in the fall during a relatively short harvest season. Olives are used in a variety of forms, including table olives and olive oil. All olives require processing before human consumption. Often, the harvested olives are stored and then processed at different times of the year. Traditionally, harvested olives are stored in a liquid solution of water and vinegar or various organic acids in large tanks in order to retard bacterial attack, which degrades the olives. In one example, acetic acid (about 1% by volume) is added to the water to preserve the olives during storage at ambient temperature, which may last 12 months or longer.

The low pH of the storage solution inhibits bacterial growth, especially yeast. Over time, however, juice from the olives, which contains various salts and sugars, diffuses into the storage liquid solution. This increases the pH and increases sugars, providing food and ideal pH for yeast and bacteria to feed on. The yeast comes from the surround air. Fermentation imparts an undesirable fermented taste. This fermentation is readily observed in the storage tanks in the form of $CO_2$ bubbles constantly rising to the surface. In addition, dangerous bacteria favor a higher pH for growth. Very little of the bitter taste is removed from the olive during storage.

In order to counteract, more acetic acid is added to lower the pH. The acetic acid is expensive and the pH is not lowered enough to completely stop the yeast from fermenting the olive sugar. In addition, the naturally occurring salts in the olives cause the olive oil and pigment to leach out during storage.

The olives are periodically pulled out of storage for processing. The organic acid and olive juice remove olive oil, color and flavor from the olive and ends up in the storage water. The olives are rinsed and generate significant amounts of waste water that is high in oil, color, organic acids, and salts.

The acetic acid and olive juice are rinsed out before proceeding to the next step. This produces large amounts of hazardous waste water, which must be digested at great expense in order to destroy organic material and nitrogen compounds before disposal.

The cost of vinegar and other organic acids is significant, plus the cost of neutralizing these acids is significant. The neutralized acids are destroyed in digestion ponds which also adds to the cost of processing.

Oleuropein is a major phenolic compound in olives and is responsible for their naturally bitter taste. Olives can be consumed only after debittering. Fresh or stored olives are exposed to lye (sodium hydroxide or potassium hydroxide) in order to oxidize the bitter chemicals with air (oxygen) at a high pH (12 to 14). Table olives are often rinsed and then exposed to lye (sodium hydroxide) and air to destroy the bitter taste and partially develop a desired olive color. The olives are neutralized with $CO_2$ (another cost) and rinsed with water. This generates yet another waste water stream that needs to be neutralized and digested in order to destroy the organic oils, pigments etc.

A significant portion of the lye is consumed, neutralizing the organic acid, the $CO_2$ in the air, and overcoming the buffering action of the olive salts. Compressed air also adds to the cost. The residual sodium bicarbonate imparts an unpleasant flavor to the olives.

The high level of salt in the waste water is too high, so the waste water is evaporated in large ponds. These ponds are expensive to operate and maintain.

For certain table olives, the color of the olives after the lye is not black enough. Therefore, the olives are soaked in iron gluconate to impart a black color. The iron taste is undesirable, so the excess iron is washed off, which produces still more waste water.

It would be desirable to provide an olive storage and processing method wherein liquid storage solution may be regenerated and reused.

It would further be desirable to provide an olive storage and processing method wherein olives may be rinsed after storage in a closed loop fashion.

It would also be desirable to provide an olive storage and processing method utilizing a process of contacting lye cure water with a falling film with oxygen or air to reduce bitter taste.

It would also be desirable to provide an olive storage and processing method wherein potassium hydroxide is used instead of lye as a curing water agent.

SUMMARY OF THE INVENTION

The present invention is directed to an olive storage and processing method. In one method of the invention, harvested olives are loaded into a storage tank filled with a storage solution of water.

The storage solution, which also contains juices from the olives containing sugars and salts, is passed via a line to a first stage ion exchange vessel through a valve. The first ion exchange vessel includes a strong acid ion exchange resin in hydrogen form at ambient temperature and pressure. By passing the storage solution through the strong acid resin, potassium and nitrogen ions are converted, while organic acids are released in order to create an acidic solution.

The acidic solution thereafter may be passed through a valve by a pump and a line to a second stage ion exchange vessel having a strong acid ion exchange resin in hydrogen form at ambient temperature and pressure.

The acidic solution is then passed via action of a pump back to the storage tank where it is aerated by a sprayer before returning as storage solution in a closed loop procedure.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
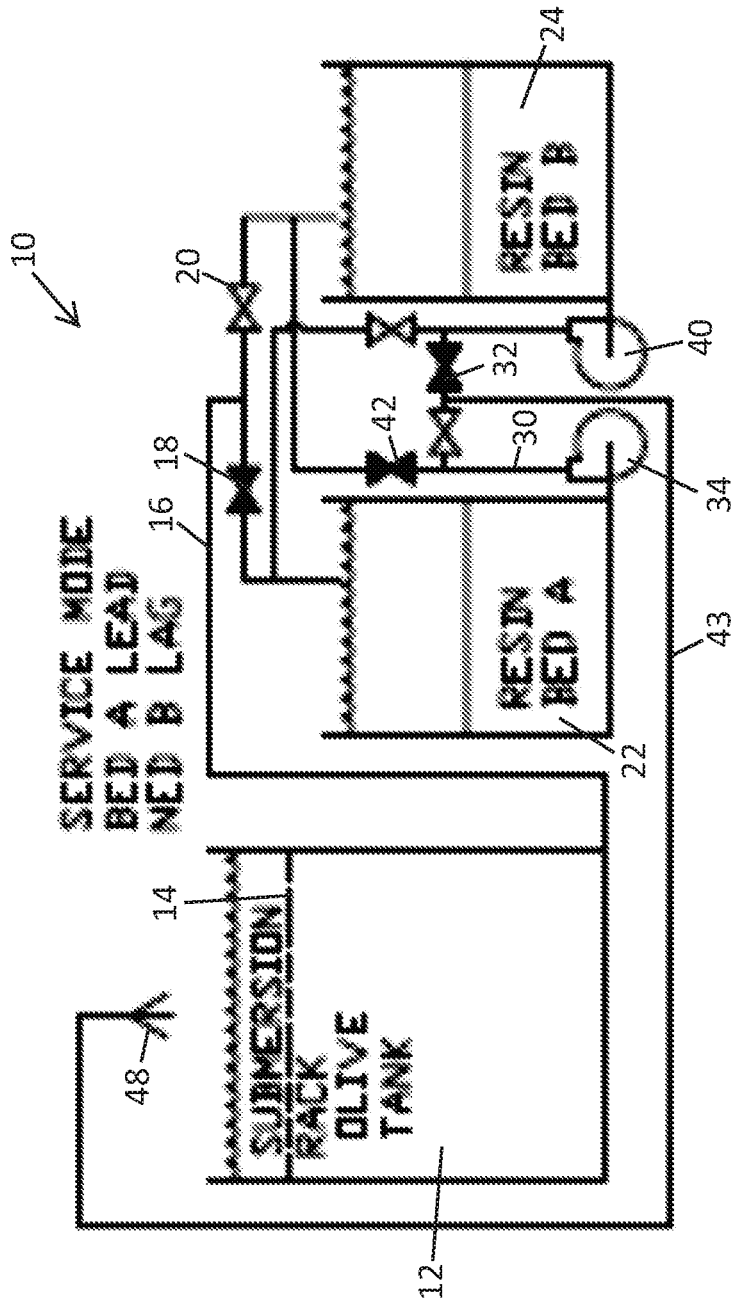
FIG. 1 illustrates a simplified schematic drawing of a first embodiment of the olive storage and processing method of the present invention.

Referring to the drawings in detail, FIG. 1 illustrates a simplified schematic drawing of a first embodiment 10 of the olive storage and processing method. Harvested olives are loaded into a storage tank 12. In a non-limiting example, the storage tank 12 may hold 10,000 to 15,000 gallons. The tank is filled with a storage solution of water produced as a part of the invention process as described herein. As will be seen, citric acid is maintained at approximately 1% by volume of the storage solution. A submersion rack 14 near the top of the storage tank assists in keeping the olives submerged. The olives are stored in the storage solution until they are periodically removed for processing.

The storage solution, which also contains juices from the olives containing sugars and salts, is passed via a line 16 to either a first stage ion exchange vessel 22 or a second stage ion exchange vessel 24 though valves 18 and 20. In FIG. 1, the valve 18 is open and the valve 20 is closed. The solution is passed to the first stage ion exchange vessel. The first vessel 22 has a strong acid ion exchange resin in hydrogen form at ambient temperature and pressure. In one non-limiting example, the ion exchange resin may be Purolite™ C100H, although other ion exchange resins may be used. By passing the storage solution through the strong acid resin, potassium and nitrogen ions and other cations are converted in the first ion exchange resin, while releasing organic acids in order to create an acidic solution.

The acidic storage solution is then passed via a line 30 through a valve 32 via a pump 34 to the second stage ion exchange vessel 24. The second vessel 24 has a strong acid ion exchange resin in hydrogen form at ambient temperature and pressure. In one example, the ion exchange resin may be Purolite™ C100H, although other ion exchange resins may be used. By passing the storage solution through the strong acid resin, potassium and nitrogen ions and other cations are converted in the second ion exchange resin, while releasing organic acids in order to create an acidic solution.

The strong acid resin exchanges naturally occurring cations in the olive juice, such as potassium, calcium, magnesium, and amines for protons, and releases organic acids, such as citric acid that occur in the olive juice as salts. For example, potassium citrate occurs in olive juice. As it passes through the strong acid ion exchange resin, it exchanges the potassium cation of the potassium citrate for a proton to release citric acid. This eliminates the buffering action of the potassium citrate and the citric acid lowers the pH of the storage water in order to stop the yeast fermentation process.

The citric acid solution is then passed via action of pump 40 through a valve 42 back to the converted in storage tank, where it is aeriated by a sprayer 48 before returning as storage solution.

The solution is recycled in a closed loop fashion. The olive acid concentration doubles, which lowers the pH even more. Each time the storage water is reused, the olive acid concentration increases. The low pH and lack of olive salts in the storage water keeps the olive oil and pigments from diffusing away from the olives, while inhibiting fermentation.

The exposure of the low pH juice to air oxidizes encourages destruction of the bitter tasting chemicals and develops the color of the olives. The combined low pH and exposure to air inhibits the growth of a broad spectrum of bacteria.

Figure 2:
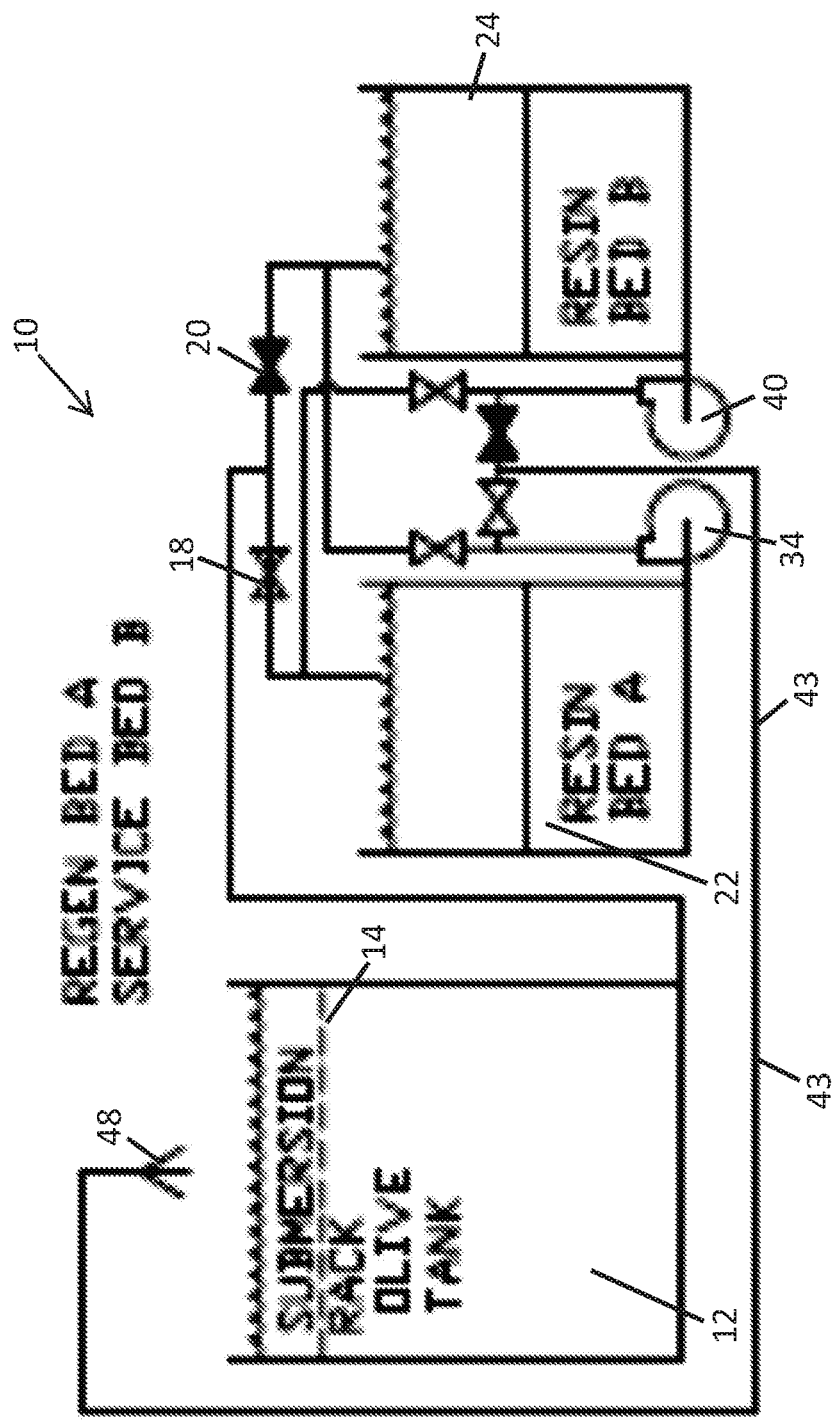
FIG. 2 illustrates a simplified schematic diagram of the process of the present invention in an alternate configuration with a first ion exchange vessel in a regeneration mode and a second vessel in the service mode.

FIG. 2 shows the process of the present invention in an alternate configuration with the first ion exchange vessel 22 in a regeneration mode and the second vessel 24 in the service mode previously described. The valve 18 is closed and the valve 20 is open so that storage solution from the storage tank 12 is delivered to the second ion exchange vessel 24 for exposure to the strong acid ion exchange resin. The resulting citric acid solution is then pumped back to the storage tank 12 for reuse.

Meanwhile, the second ion exchange vessel 24 is in regeneration mode. Once the strong acid in the resin is exhausted, it may be regenerated. Sulfuric acid is passed through the second vessel 24 in liquid form. Since the majority of the cation content is potassium, the regeneration produces potassium sulfate, which is a valuable fertilizer.

Figure 3:
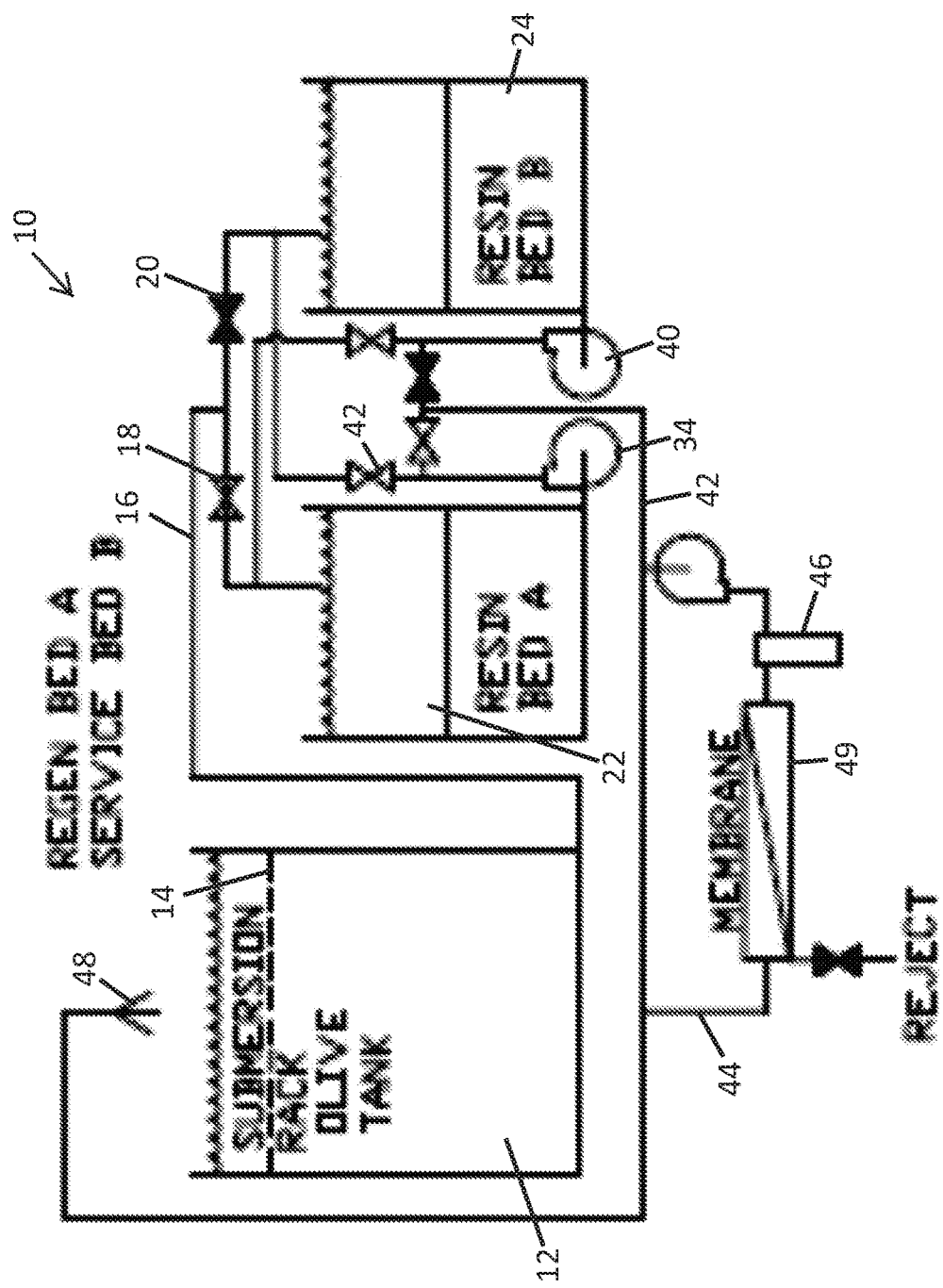
FIG. 3 illustrates a simplified schematic diagram of a further feature of the process of the present invention utilizing a cross-flow filter and a reverse osmosis membrane.

FIG. 3 illustrates a further feature of the process of the present invention. The returning citric acid solution in line 43 is diverted through a line 44 through a cross flow filter 46 and a reverse osmosis membrane 49. The filter is used to protect the membrane. A cross flow filter is preferred because they are much less prone to fouling, have higher filtration capacity, and are easier to clean. FIG. 3 shows the membrane 49 working parallel with the strong acid resin. The permeate through the membrane is returned to the liquid storage tank. The reject flow may be collected as a byproduct.

The cross-flow filter 46 and reverse osmosis membrane 49 remove bacteria and lower the organic materials from the storage solution, which inhibits bacterial activity. This allows the harvesting of olive acid and olive sugar to occur at any time without interfering with the storage process.

Figure 4:
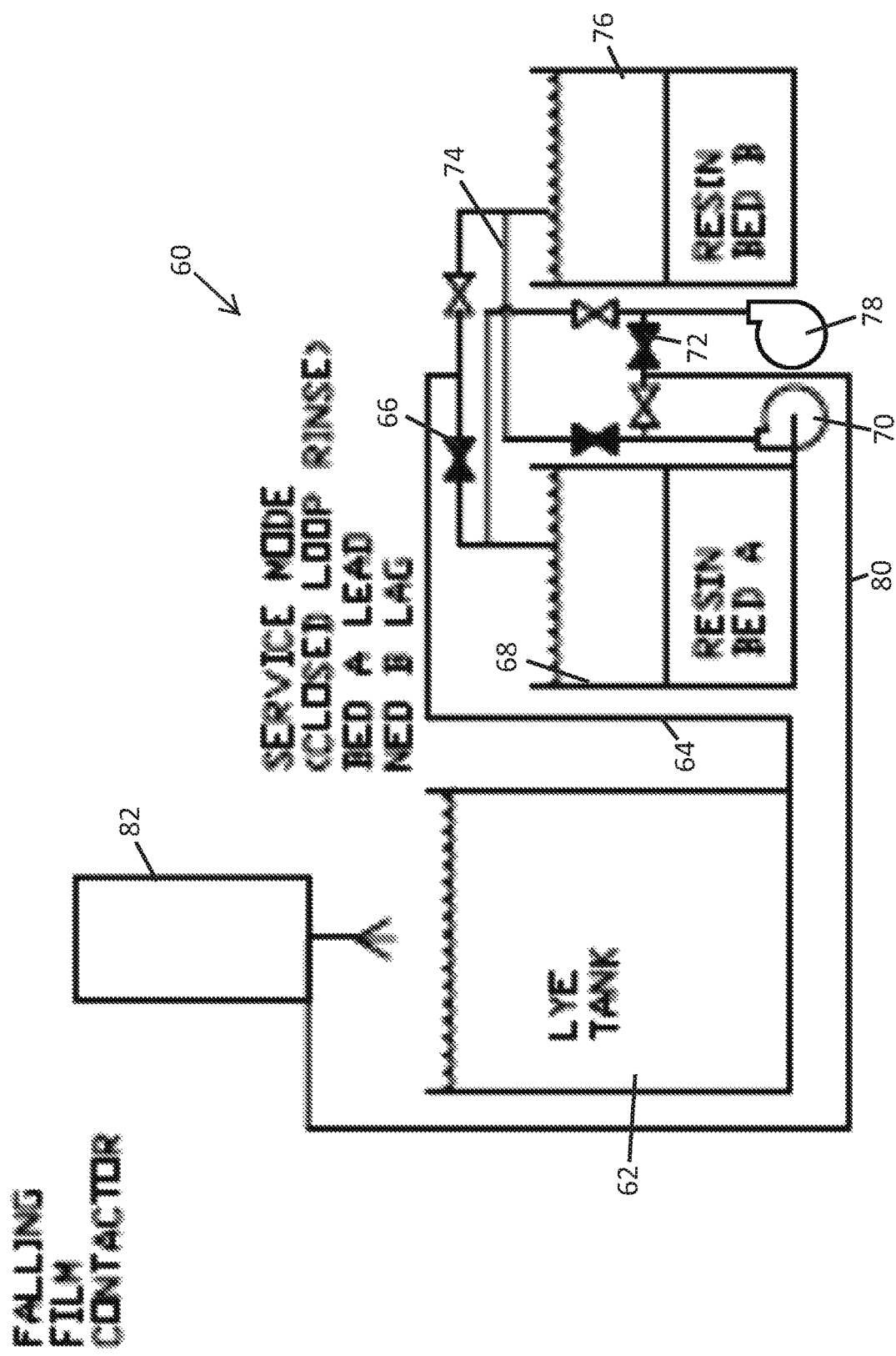
FIG. 4 illustrates a simplified schematic diagram of a further process of the present invention which replaces the traditional exposure of the olives to potassium hydroxide or sodium hydroxide.

FIG. 4 illustrates a further process 60 of the present invention, which replaces the traditional exposure of the olives to potassium hydroxide or sodium hydroxide (generally referred to a lye) in order to oxidize the bitter chemicals with air or oxygen. The olives are submersed in a lye tank 62 in a potassium hydroxide or sodium hydroxide solution. The rinse solution is passed via a line 64 through a valve 66 to a first ion exchange vessel 68, which contains a weak acid resin in hydrogen form, which removes the lye from the rinse water. In one non-limiting example, the weak acid resin is Purolite C104Plus.

The rinse water may be pumped via a first pump 70 though a valve 72 via a line 74 to a second ion exchange vessel 76 which contains a weak acid ion exchange resin in hydrogen form. The solution is then pumped by pump 78 via line 80 to a falling film contactor 82 that exposes the rinse water to CO2 free oxygen gas to produce an oxygen saturated liquid. This eliminates the need for compressed air and eliminates the foam created with the prior art bubblers. The dissolved oxygen concentration is much higher and no excess oxygen is needed. This accelerates bitter destruction and facilitates color development. The use of potassium hydroxide is preferred, because it produces a better tasting olive and may be recovered as a valuable fertilizer. Since much of the bitters are destroyed during storage, the lye exposure time is reduced.

The weak acid resin may be periodically regenerated using sulfuric acid as previously described.

Figure 5:
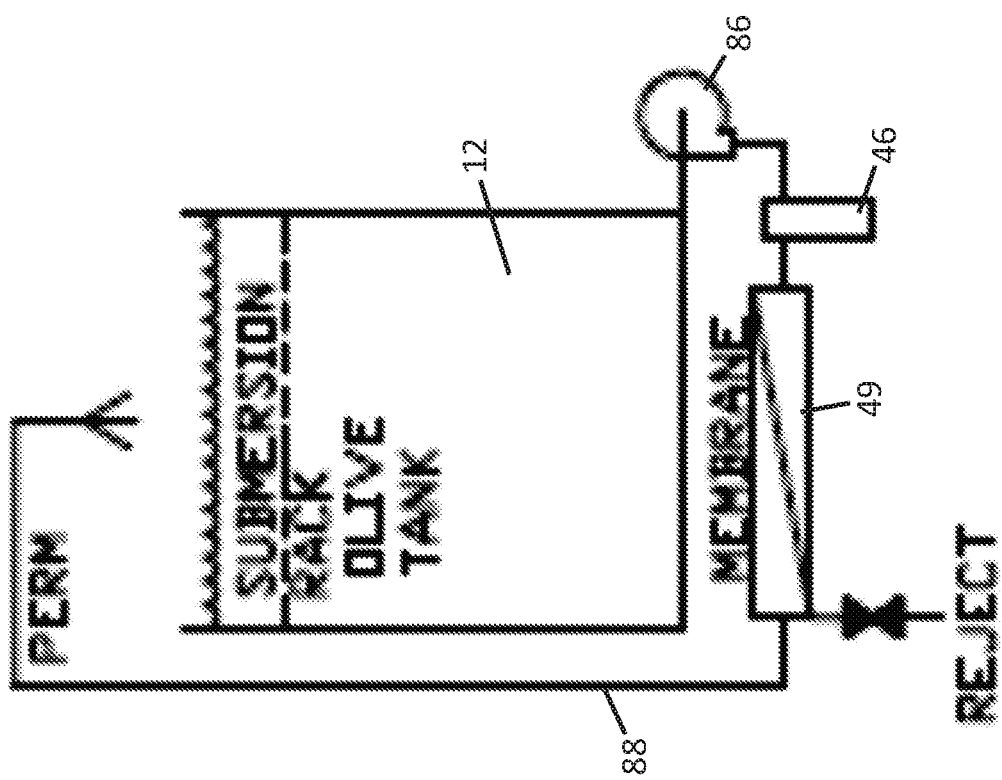
FIG. 5 illustrates a simplified schematic diagram of an alternate configuration where the storage solution is pumped via a pump though a cross-flow filter and the reverse osmosis membrane before returning to the storage tank in closed loop fashion.

FIG. 5 illustrates an alternate configuration where the storage solution is pumped via pump 86 though the cross-flow filter 46 and the reverse osmosis membrane 49 before being returned via line 88 to the storage tank.

Figure 6:
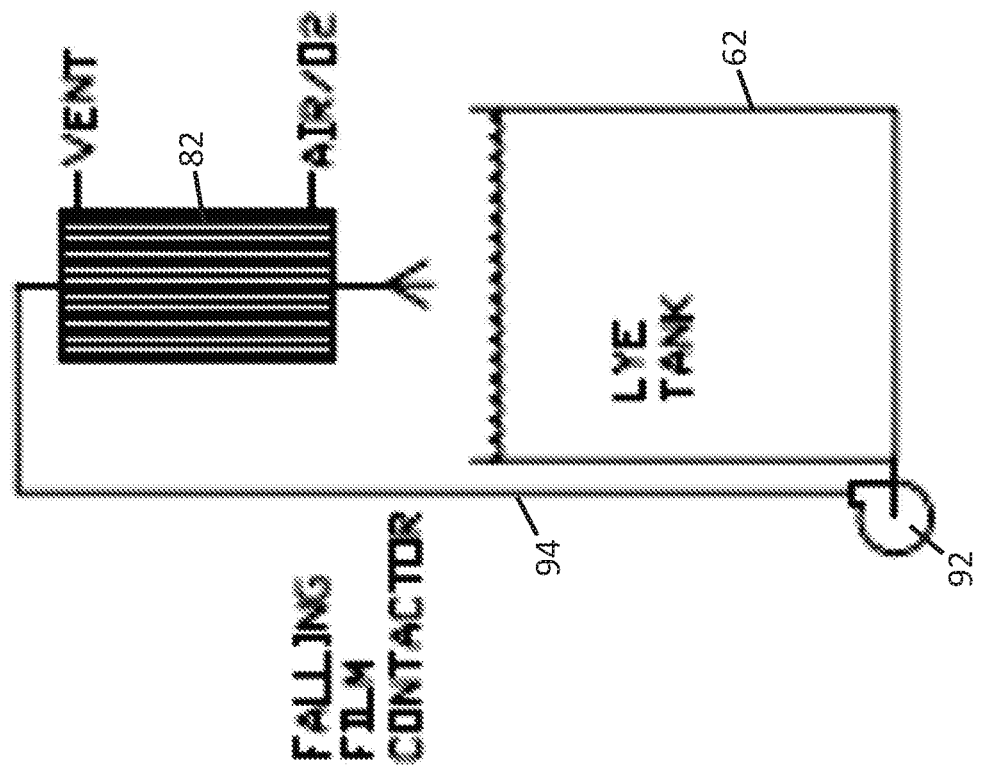
FIG. 6 illustrates a simplified schematic diagram of a further or alternate configuration for the potassium hydroxide or sodium hydroxide water processing.

FIG. 6 illustrates a further or alternate configuration for the lye water processing. The lye water is pumped via a pump 92 through a line 94 to falling film contactor 82.

The process of the present invention produces a number of improvements over the prior art processes as follows:

|  | PRIOR ART | INVENTION |
| --- | --- | --- |
| Waste water from olive storage and lye step | Large volume | None |
| Neutralization of lye step water with CO2 | Yes | None |
| Lye step rinse time | 18 hours | 6 hours |
| Acetic acid addition to storage water | About 1% | None |
| Yeast fermentation | Yes | None |
| Potassium recovery as fertilizer from olives | No | Yes |
| Bitter oxidation (destruction) during storage | No | Yes |
| Pigment development during storage | No | Yes |
| pH | 3.5 to 5 | 2 to 3 |
| Olive acid (citric acid) recovery | No | Yes |
| Olive sugar recovery | No | Yes |
| Closed loop washing after storage | No | Yes |
| Amine removal during storage | No | Yes |
| Olive oil in storage water | Yes | No |
| Olive pigment in storage water | Yes | No |
| Hazardous waste water generation | Yes | No |
| Coloring the olives with iron gluconate | Yes | Limited to none |

Whereas, the invention has been described in relation to the drawings attached hereto, it should be understood that other and further modifications, apart from those shown or suggested herein, may be made within the scope of this invention.

What is claimed is:

1. An olive storage and processing method, which method comprises:
    storing harvested olives in a storage tank prior to processing containing a storage solution of water, wherein said storage solution contains both salts and juices from said olives;
    passing said storage solution to a first ion exchange vessel having an acid ion exchange resin in hydrogen form at ambient temperature and pressure;
    exchanging potassium and nitrogen ions and other cations from said storage solution and converting said potassium and nitrogen ions and other cations in the first ion exchange resin into organic acids in order to create an acidic solution; and
    returning the acidic solution to the storage tank for reuse as an olive storage solution.

2. The olive storage solution as set forth in claim 1 including repeating the processing method of claim 1 in a closed loop fashion until pH is at a level between 2 and 3.

3. The olive storage and processing method as set forth in claim 1 including the additional step of:
    passing said storage solution from the first ion exchange vessel after said converting to a second ion exchange vessel having an acid ion exchange resin in hydrogen form to create an acidic solution before returning the acidic solution to the storage tank.

4. The olive storage and processing method as set forth in claim 1 including the additional step prior to returning the acidic solution to the storage tank of:
    exposing the acidic solution to atmospheric air or oxygen.

5. The olive storage and processing method as set forth in claim 1 including the additional steps of passing the acidic solution in said storage tank through a cross-flow filter and through a reverse osmosis membrane.

6. The olive storage and processing method as set forth in claim 3 including pumping said storage solution from said first ion exchange vessel to said second ion exchange vessel.

7. The olive storage and processing method as set forth in claim 1 including regenerating the acid ion exchange resin in hydrogen form with sulfuric acid.

\* \* \* \* \*